US010407333B2

(12) United States Patent
Carolla et al.

(10) Patent No.: US 10,407,333 B2
(45) Date of Patent: Sep. 10, 2019

(54) METHODS AND APPARATUS FOR CONSTRUCTING GLASS FURNACE STRUCTURES

(71) Applicant: FOSBEL, INC., Brook Park, OH (US)

(72) Inventors: Lou Carolla, Brook Park, OH (US); Michael Smith, Brook Park, OH (US); Alan E. Bowser, Jr., Brook Park, OH (US)

(73) Assignee: FOSBEL, INC., Brook Park, OH (US)

( * ) Notice: Subject to any disclaimer, the term of this patent is extended or adjusted under 35 U.S.C. 154(b) by 501 days.

(21) Appl. No.: 15/013,300

(22) Filed: Feb. 2, 2016

(65) Prior Publication Data

US 2016/0221854 A1 Aug. 4, 2016

Related U.S. Application Data

(60) Provisional application No. 62/111,424, filed on Feb. 3, 2015.

(30) Foreign Application Priority Data

Feb. 25, 2015 (GB) .................................. 1503127.1

(51) Int. Cl.
C03B 5/42 (2006.01)
B66C 7/08 (2006.01)
(Continued)

(52) U.S. Cl.
CPC .................. C03B 5/42 (2013.01); B66C 7/08 (2013.01); B66C 11/12 (2013.01); F27D 1/16 (2013.01);
(Continued)

(58) Field of Classification Search
CPC ........... B66B 9/16; B66C 17/06; B66C 23/18; B66C 23/20; B66C 23/202; B66C 23/205;
(Continued)

(56) References Cited

U.S. PATENT DOCUMENTS 3,427,009 A 2/1969 Schute
4,064,616 A 12/1977 Kubota et al.
(Continued)

FOREIGN PATENT DOCUMENTS

CN 2905715 5/2007
GB 2 151 004 7/1986
(Continued)

OTHER PUBLICATIONS

International Search Report and Written Opinion, PCT/US2016/016060, dated Apr. 21, 2016.
Search Report for GB 1503127.1 dated Jul. 30, 2015, 1 page.

Primary Examiner — Michael R Mansen
Assistant Examiner — Juan J Campos, Jr.
(74) Attorney, Agent, or Firm — Nixon & Vanderhye P.C.

(57) ABSTRACT

Methods and apparatus are provided for constructing refractory structures, e.g., glass furnace regenerator structures and/or glass furnace structures formed of refractory components, by positioning opposed pairs of vertically oriented base beams on respective opposite sides of the refractory structure and having a lower end rigidly attached to a foundation of the refractory structure and an upper end which extends vertically above the refractory structure, and attaching cross-support beams to respective ones of the base beams at the upper end thereof so as to latitudinally span the refractory structure. An overhead crane assembly may thus be supported by the cross-support beams.

8 Claims, 2 Drawing Sheets

Figure 1:
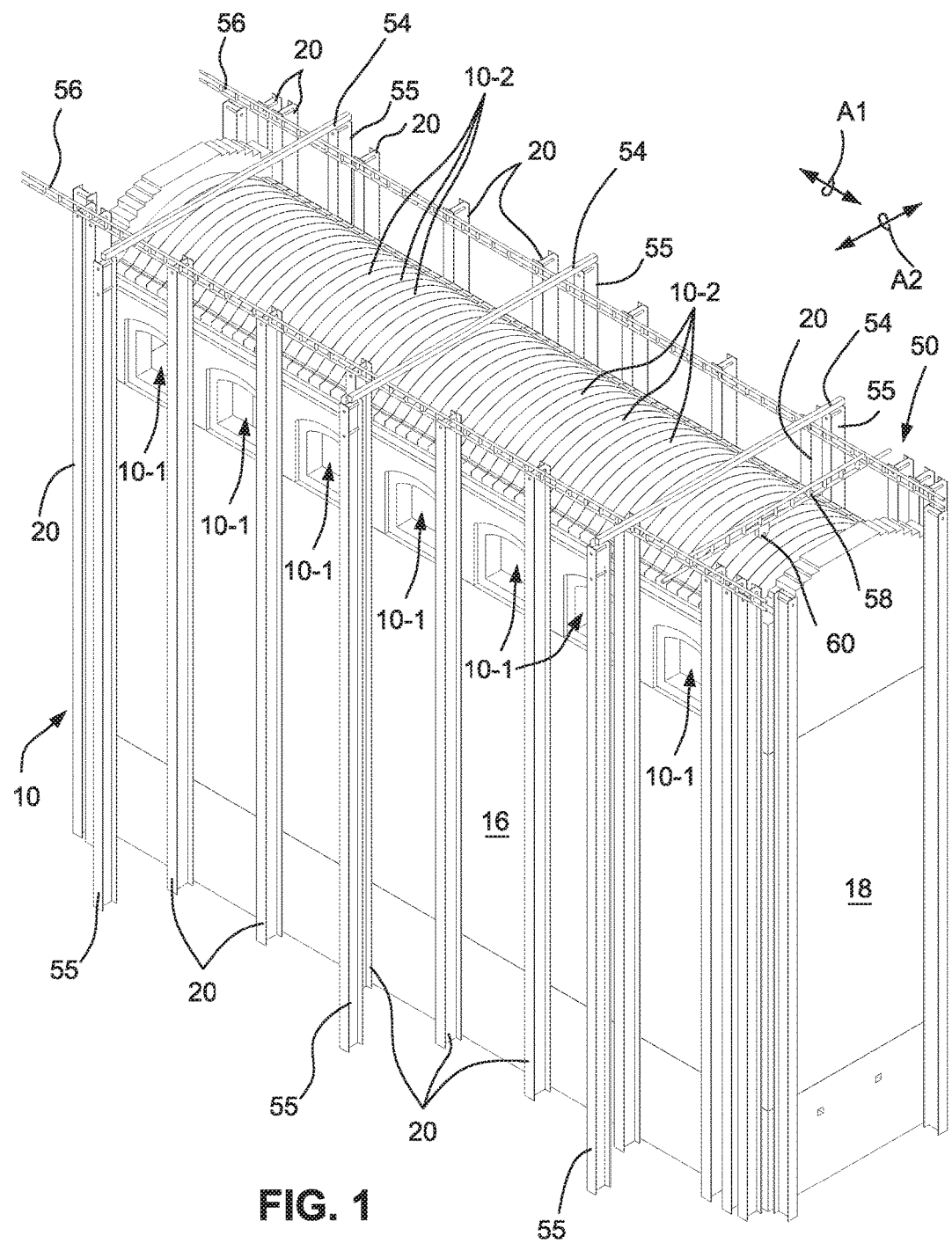

(51) Int. Cl.
*B66C 11/12* (2006.01)
*F27D 1/16* (2006.01)
*F27D 1/00* (2006.01)

(52) U.S. Cl.
CPC .... *F27D 1/1621* (2013.01); *F27D 2001/0079* (2013.01)

(58) Field of Classification Search
CPC ......... B66C 23/208; C10B 29/06; F27D 1/10; F27D 1/16
See application file for complete search history.

(56) References Cited

U.S. PATENT DOCUMENTS

| | | | |
|---|---|---|---|
| 7,827,689 B2 * | 11/2010 | Crane | C10B 29/02 110/314 |
| 2008/0169578 A1 * | 7/2008 | Crane | C10B 29/02 264/30 |
| 2016/0137540 A1 * | 5/2016 | Bowser, Jr. | C03B 5/2375 432/216 |
| 2016/0221801 A1 * | 8/2016 | Carolla | B66C 17/06 |
| 2016/0221854 A1 * | 8/2016 | Carolla | C03B 5/42 |

FOREIGN PATENT DOCUMENTS

| | | | | |
|---|---|---|---|---|
| JP | 59-75980 | 4/1984 | | |
| JP | 2010-280809 | 12/2010 | | |
| JP | 2012-127593 | 7/2012 | | |
| WO | WO-2012078036 A2 * | 6/2012 | ............. | B66C 17/04 |

* cited by examiner

METHODS AND APPARATUS FOR CONSTRUCTING GLASS FURNACE STRUCTURES

CROSS-REFERENCE TO RELATED APPLICATIONS

This application is based on and claims domestic priority benefits under 35 USC § 119(e) from U.S. Provisional Application Ser. Nos. 62/111,424 filed on Feb. 3, 2015 and also claims foreign priority benefits under 35 USC § 119(a) from GB 1503127.1 filed on Feb. 25, 2015, the entire contents of each such prior filed application being expressly incorporated hereinto by reference.

FIELD

The embodiments disclosed herein relate generally to methods and apparatus for constructing refractory structures associated with glass furnaces.

BACKGROUND

In the manufacturing process for making glass, raw materials including sand, lime, soda ash and other ingredients are fed into a furnace, sometimes called a glass tank. The raw materials are subjected to temperature above about 2,800° F. in the glass furnace which causes the raw materials to melt and thereby form a molten bed of glass that exits the glass furnace for further downstream processing into glass products.

The most common way of heating the glass furnace is through the combustion of a hydrocarbon fuel source, such as natural gas or oil. The hydrocarbon fuel is mixed with combustion air inside the furnace and combusted to thereby transfer the combustion heat energy to the raw materials and glass melt prior to exiting the furnace.

In order to improve the thermal efficiency of the combustion process, the combustion air used to combust the fuel is preheated by means of regenerator structures. More specifically, a supply of combustion air is preheated in a honeycombed pack of checker bricks contained within the interior of the regenerator structure. Fresh combustion air is drawn up through the pack of heated checker bricks in the regenerator structure and preheated by means of heat transfer. The pre-heated combustion air may then be mixed with the fuel, combusted. Waste combustion gas exits the glass furnace and passes through a second regenerator structure. As the waste gasses pass through the second regenerator the checkers in the pack are heated by means of heat transferred from the waste gas. After a predetermined time has elapsed (e.g., after about 15-30 minutes), the process cycle is reversed so that the checker bricks in one of the regenerator structures that were being heated by heat transfer with the waste gas are then used to preheat the fresh combustion air while the checker bricks in the other regenerator structures that were used to preheat the combustion air are then re-heated by heat transfer with the waste combustion gas. See in this regard, U.S. Pat. No. 3,326,541 (the entire content of which is expressly incorporated hereinto by reference).

The current process for building glass furnace refractory structures, e.g., regenerators, glass furnaces including glass furnace refiners, fore hearths and the like, is very labor intensive taking many weeks as it requires the placement of hundreds of thousands of refractory bricks that may be individually coated with mortar and positioned or in some cases essentially dry set with minimal (if any) mortar. As is well known in the glass making industry, the joints associated with the bricks of the furnace refractory structures are the weakest part of the structure and are consequently more readily susceptible to degradation by the corrosive hot gasses passing therethrough. As the brick joints begin to erode, the walls forming the refractory structure face increased attack as the corrosive gasses begin to condense and dissolve the refractory materials forming the bricks thereby weakening the structure. As the structure becomes weakened, the glass furnace itself may become compromised and fail which could then require a complete shut down and rebuilding operation.

It can be appreciated therefore, that if the refractory structures could be fabricated from larger refractory blocks, then fewer joints would ensue thereby prolonging the regenerator structure's useful life and minimizing down time due to rebuilding. However, while large refractory blocks can be fabricated by pressing, molding or casting a refractory material, it is problematic to install such blocks during construction of a large-scale refractory structure.

In addition to the problems noted above, many of the components of the refractory structure, e.g., checker bricks used in glass regenerator structures, need to be replaced near or at the end of their useful life in order to maintain optimal production efficiencies. It is currently difficult to replace such components, e.g., the checker bricks, when it may be desired for them to do so.

What has been needed therefore are improvements in apparatus and methods whereby refractory structures may be efficiently and economically constructed and/or re-built. It is towards providing such improvements that the embodiments of the present invention are directed.

SUMMARY

In general, the embodiments disclosed herein are directed toward methods and apparatus for constructing refractory structures, e.g., glass furnace regenerator structures and/or glass furnace structures formed of refractory components, by positioning opposed pairs of vertically oriented base beams on respective opposite sides of the refractory structure and having a lower end rigidly attached to a foundation of the refractory structure and an upper end which extends vertically above the refractory structure, and attaching cross-support beams to respective ones of the base beams at the upper end thereof so as to latitudinally span the refractory structure. An overhead crane assembly may thus be supported by the cross-support beams.

The overhead crane assembly may comprise a pair of raceway beams longitudinally extending relative to the refractory structure and dependently supported by the cross-support beams, a bridge beam moveable mounted to the pair of raceway beams for reciprocal movements therealong in a longitudinal direction of the refractory structure, and a hoist moveably mounted to the bridge beam for reciprocal movements therealong in a latitudinal direction of the refractory structure.

One end portion of the raceway beams may be supported in a cantilever manner according to some embodiments by a respective pair of support beams and cross-support beam and so as to extend beyond a respective end of the refractory structure.

According to certain embodiments, methods of constructing a crane assembly relative to a refractory structure formed of refractory components, includes (i) installing opposed pairs of vertically oriented base beams positioned on respective opposite sides of the refractory structure such that a lower end thereof is rigidly attached to a foundation of the refractory structure and an upper end thereof extends vertically above the refractory structure, (ii) supporting the cross-support beams with the base beams by attaching a respective end of the cross-support beams to the upper end of a respective one of the base beams, and (iii) supporting an overhead crane assembly by the cross-support beams.

The refractory structure may a glass furnace regenerator structure having walls comprised of refractory blocks and an interior comprised of checker bricks, in which case the method may include operating the overhead crane assembly so as to position the refractory blocks and/or the checker bricks. Other refractory structures associated with glass furnace systems, e.g., cross-fired glass furnaces, end-fired glass furnaces and electric glass furnace systems may be provided with the crane assemblies as disclosed herein.

These and other aspects and advantages of the present invention will become more clear after careful consideration is given to the following detailed description of the preferred exemplary embodiments thereof.

BRIEF DESCRIPTION OF ACCOMPANYING DRAWINGS

Figure 2:
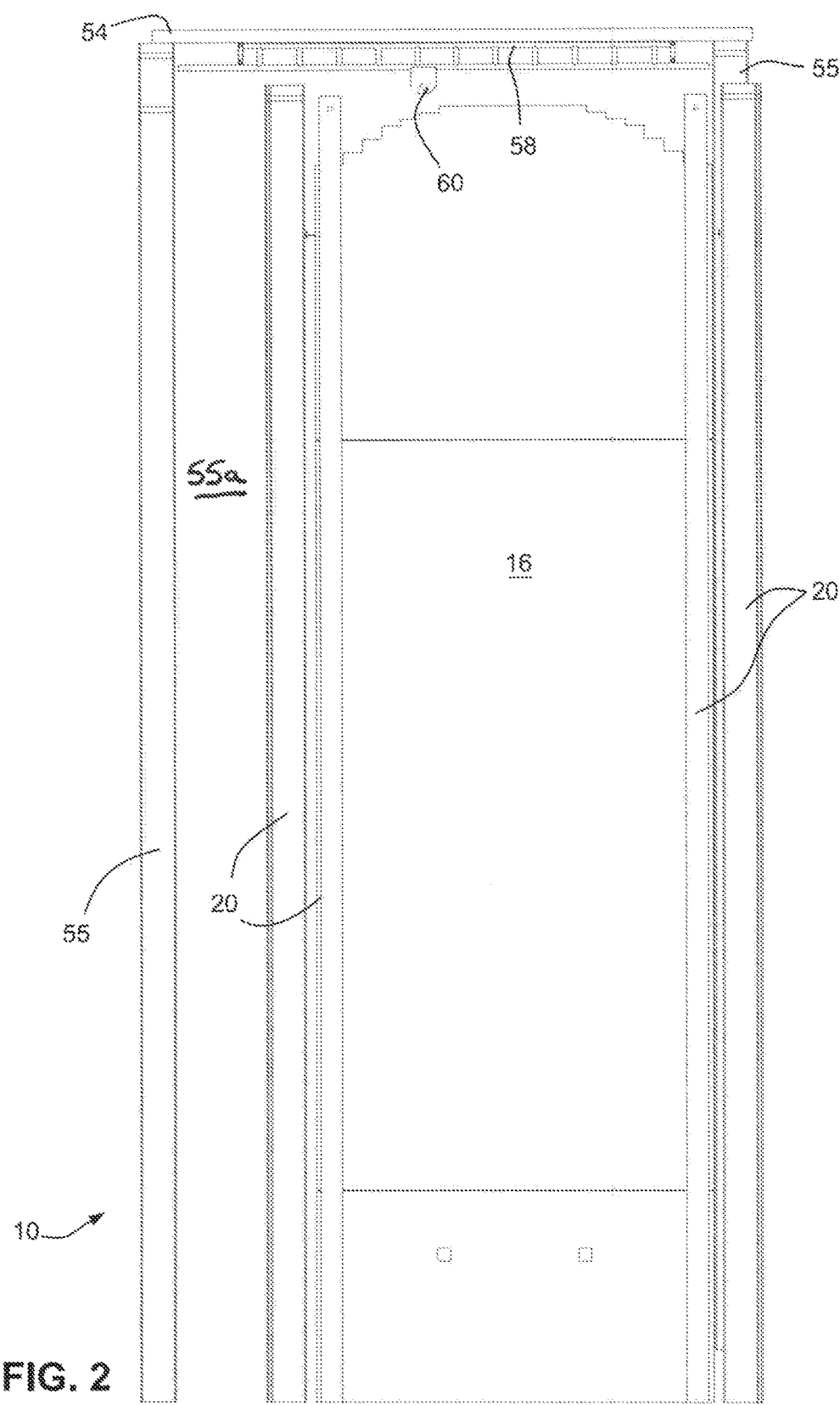

The disclosed embodiments of the present invention will be better and more completely understood by referring to the following detailed description of exemplary non-limiting illustrative embodiments in conjunction with the drawings of which:

FIG. 1 is a perspective view of a regenerator structure showing an apparatus in accordance with an embodiment of the present invention; and FIG. 2 is an enlarged end elevation view of the regenerator structure depicted in FIG. 1.

DETAILED DESCRIPTION

Accompanying FIG. 1 schematically depicts a perspective view of a regenerator structure 10 showing an overhead crane apparatus 50 in accordance with an embodiment of the present invention. As is known, the regenerator structure 10 is constructed of large pre-cast refractor blocks stacked on a foundation to thereby side and end walls 16, 18, respectively. It will be appreciated that the regenerator structure 10 is used in operative combination with a glass furnace (not shown). The regenerator structure 10 generally depicted in the accompanying FIGURES is of a type used for side-fired glass furnaces. However, the attributes of the embodiments of the invention to be described herein are equally applicable to other glass furnace designs, e.g. end-fired glass furnaces.

The regenerator structure 10 includes a series of ports 10-1 which are used to introduce pre-heated combustion air into the glass furnace (not shown) or to exhaust combustion gas from the furnace depending on the operational cycle. The top of the regenerator structure 10 is capped with crowns (a representative few of which are noted by reference numeral 10-2). The walls 16, 18 are structurally supported by external upright structural beams known colloquially as buck stays 20. As is known, the buck stays 20 are compressively held against the walls by means of tie rods (not shown) extending between opposed pairs of buck stays 20 both latitudinally and longitudinally relative to the regenerator structure 10.

The overhead crane apparatus 50 in accordance with an embodiment of the invention is depicted as including cross-support beams 54 latitudinally spanning the regenerator structure 10. The opposed ends of the cross-support beams 54 are supported by a respective one of the vertically oriented base beams 55 on opposite sides of the regenerator structure 10. The ends of the cross-support beams 54 are rigidly attached to the upper ends of the vertical base beams 55 by any suitable means, e.g., riveting, welding, clamping or the like). As shown, one of the vertically oriented base beams 55 is positioned adjacent to a respective side wall 16 between a respective pair of the buck stays 20 while an opposite one of the vertically oriented base beams 55 is laterally spaced from a respective side wall 16 so as to establish a vertically oriented space 55a (see FIG. 2) therebetween.

Each of the base beams 55 has its lower end rigidly fixed to the foundation 14 and extends vertically upwardly to its opposite end at a position which is elevated above the crown arches 10-2.

The longitudinal base beams 55 for supporting the crane system can be supported and stabilized by any technique known in the structural art. For example, the longitudinal base beams 55 may have platform feet at the bottom which will be affixed to the concrete or metal base by bolts or weldment. While the top of the longitudinal beams will be partially supported by the crane support beam which spans the refractory structure and joins the two beams, additional kicker supports may be required from the existing regenerator steel supports (e.g., buck stays) to provide some lateral support at various points along the horizontal span of the beam. If the surrounding area of the regenerator structure is too congested to allow kicker supports, the horizontal cross-support beams 54 or the vertical base beams 55 could be affixed to one another near the tops of the beams to make a self-supporting structure independent of the regenerator buck stays. The particular support mechanisms and techniques will be determined by a number of factors, for example, the weight of the refractory blocks required to be moved, the height of the beams and the stability of the base structure. The design of any particular support mechanisms and techniques will therefore be well within the skill of those in the art and need not be explained in detail for a complete understanding of the invention.

The cross-support beams 54 dependently support a pair of runway beams 56 between which is connected a travelling bridge beam 58. The bridge beam 58 includes an overhead travelling hoist system 60. According to preferred embodiments, the runway beams 56 are supported in a cantilever manner by the end-most cross-support beams 54 so that the terminal end portions of such runway beams 56 extend beyond the wall 18 of the regenerator structure 10 thereby enabling access to refractory structures or other heavy equipment therebelow. In addition, the hoist system may be moved laterally so as to be at the upper region of the vertically oriented space 55a.

Suitable operator controlled motors (not shown) are provided with the bridge beam 58 to allow it to reciprocally travel along the runway beams 56 in a longitudinal direction of the regenerator structure (i.e., in the direction of arrow A1 in FIG. 1). Similarly, operator controlled motors (not shown) are provided with the hoist 60 to allow it to travel reciprocally along the bridge beam in a latitudinal direction of the regenerator structure 10 (i.e., in a direction of arrow A2 in FIG. 1). The hoist 60 may be connected to a suitable lifting sling or the like to allow refractory elements (e.g., checker bricks, refractory blocks, refractory bricks and the like) to be lifted up and into the interior of the regenerator structure 10, e.g., by suitably operating the bridge beam 58 and hoist 60 so as to travel in the directions of arrows A1 and A2 while simultaneously causing the hoist 60 to raise or lower the secured load (i.e., in a direction transverse to arrows A1 and A2). In such a manner, therefore, the checker bricks within the regenerator structure 10 may be replaced and/or refractory blocks/bricks associated with the walls 16 and/or 18 may be installed as may be needed.

Although pairs of runway beams 56 are depicted in the accompanying drawing FIGS. 1-2 as supporting a travelling bridge beam 58, the latter in turn supporting the hoist 60, the present invention could be embodied in one or more monorail systems whereby the travelling hoist 60 is carried by a monorail extending the lengthwise extent of the refractory structure. In such an embodiment, the monorail may be connected directly to the vertically oriented base beams 55 or may be connected thereto via suitable hangers as described more fully in commonly owned U.S. application Ser. No. 14/859,820 filed Sep. 21, 2015, the entire content of which is expressly incorporated hereinto by reference).

Although the embodiments have been described in relation to a cross-fired glass furnace system, the principles of the invention may likewise be embodied in any glass furnace design, such as float furnaces, end-fired furnaces, unit melters with recuperators and electric furnaces with shelf, sidewall or bottom electrodes.

Furthermore, the base beams 55 have been depicted in the accompanying drawing FIGURES as being asymmetrically located with respect to a centerline of the refractory structure 10. The depicted arrangement thereby allows for the construction of port sections of the glass furnace to be constructed more easily with module refractory blocks. A symmetrical arrangement of the base beams 55 with respect to the center line of the refractor structure 10 would of course also be possible (e.g., in those instances where the furnace ports are not desired to be reconstructed) and is thus within the scope of the invention.

It will therefore be understood that the description provided herein is presently considered to be the most practical and preferred embodiments of the invention. Thus, the invention is not to be limited to the disclosed embodiments, but on the contrary, is intended to cover various modifications and equivalent arrangements included within the spirit and scope thereof.

What is claimed is:

1. A glass furnace regenerator structure comprised of:
   refractory block components forming opposed first and second side walls;
   first and second series of upright buck stays respectively spaced-apart along a lengthwise extent of the opposed first and second side walls, and
   an apparatus to aid in the construction of the glass furnace regenerator structure, wherein the apparatus comprises:
   (i) a plurality of opposed first and second vertically oriented base beams respectively positioned adjacently to the first and second side walls of the glass furnace regenerator structure, wherein each of the first base beams is positioned between a respective spaced-apart pair of the first buck stays along the first side wall, and each of the second base beam being laterally spaced from the second buck stays and the second side wall so as to define a vertical space therebetween, and wherein each of the first and second base beams has a lower end rigidly attached to a foundation of the glass furnace regenerator structure and an upper end which extends vertically above the first and second side walls of the glass furnace regenerator structure;
   (ii) cross-support beams attached to respective opposed pairs of the first and second base beams at the upper end thereof so as to latitudinally span the first and second side walls of the glass furnace regenerator structure; and
   (iii) an overhead crane assembly supported by the cross-support beams, wherein the overhead crane assembly is capable of being moved to an upper region of the vertical space whereby construction of the glass furnace regenerator structure is aided.

2. The glass furnace regenerator according to claim 1, wherein the overhead crane assembly comprises:
   a raceway beam longitudinally extending relative to the refractory structure and dependently supported by the cross-support beams;
   a hoist assembly moveably mounted to the raceway beam.

3. The glass furnace regenerator according to claim 2, wherein the overhead crane assembly comprises:
   a pair of the raceway beams; and
   a bridge beam moveably mounted to the pair of raceway beams for reciprocal movements therealong in a longitudinal direction of the refractory structure; wherein the hoist assembly is moveably mounted to the bridge beam for reciprocal movements therealong in a latitudinal direction of the refractory structure.

4. The glass furnace regenerator according to claim 2, wherein one end portion of the raceway beam is supported in a cantilever manner by a respective cross-support beam and so as to extend beyond a respective end of the regenerator structure.

5. A method of constructing the glass furnace regenerator structure according to claim 1, wherein the glass furnace regenerator structure is housed within a building having roof support elements, wherein the method comprises:
   (i) installing opposed pairs of the vertically oriented first and second base beams positioned on respective opposite sides of the refractory structure adjacent the first and second side walls, respectively, such that a lower end of the first and second base beams is rigidly attached to a foundation of the glass furnace regenerator structure and an upper end of the first and second base beams extends vertically above the glass furnace regenerator structure;
   (ii) supporting the cross-support beams with the base beams by attaching a respective end of the cross-support beams to the upper end of a respective one of the base beams; and
   (iii) supporting the overhead crane assembly by the cross-support beams.

6. The method according to claim 5, wherein the glass furnace regenerator structure has an interior comprised of checker bricks, and wherein the method further comprises operating the overhead crane assembly so as to position the checker bricks in the interior of the glass furnace regenerator structure.

7. The method according to claim 5, which further comprises:
   (a) installing a pair of raceway beams which longitudinally extend relative to the glass furnace regenerator structure and are dependently supported by the cross-support beams;
   (b) moveably mounting a bridge beam to the pair of raceway beams for reciprocal movements therealong in a longitudinal direction of the refractory structure; and
   (c) moveably mounting a hoist to the bridge beam for reciprocal movements therealong in a latitudinal direction of the refractory structure.

8. The method according to claim 7, wherein step (a) includes installing the raceway beams so that one end portion of the raceway beams is supported in a cantilever manner by a cross-support beam to thereby cause the one end of the raceway beams to extend beyond a respective end of the glass furnace regenerator structure.

\* \* \* \* \*